Jan. 21, 1930. M. F. CRANK 1,744,614
FRUIT PICKER
Original Filed Aug. 25, 1926   2 Sheets-Sheet 1
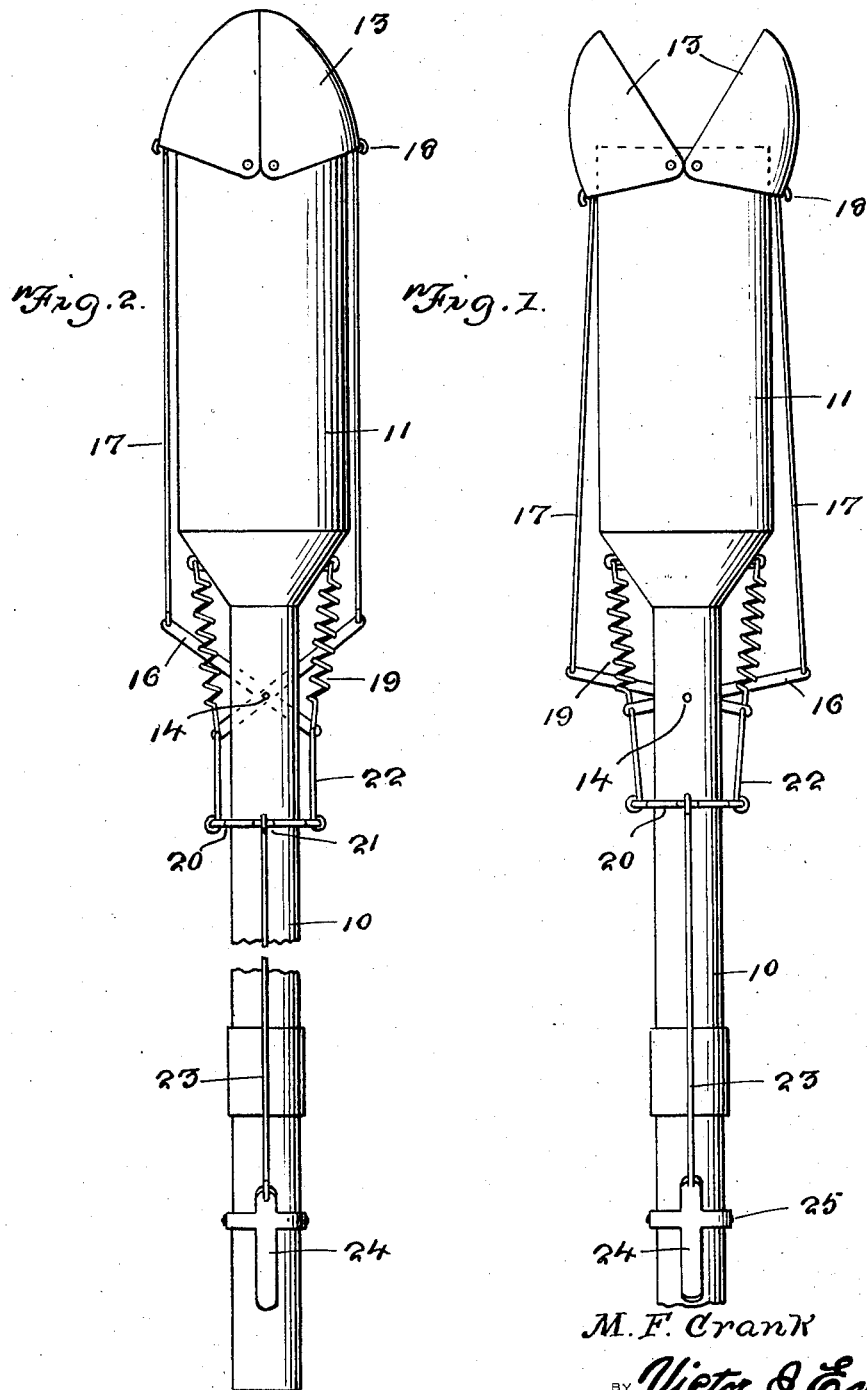
M. F. Crank
INVENTOR
BY Victor J. Evans
ATTORNEY Jan. 21, 1930.  M. F. CRANK  1,744,614
FRUIT PICKER
Original Filed Aug. 25, 1926   2 Sheets-Sheet 2
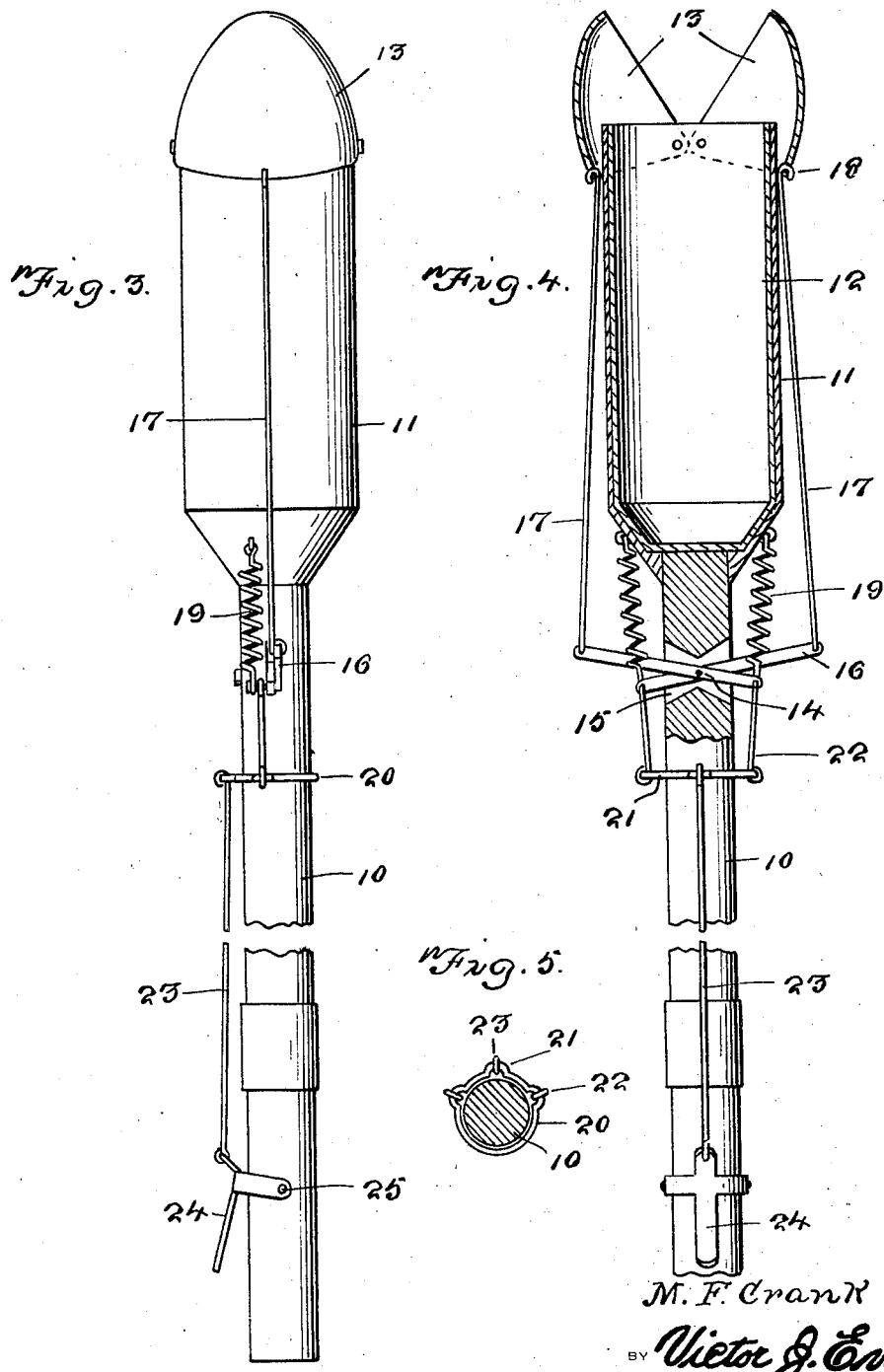

Patented Jan. 21, 1930

1,744,614

UNITED STATES PATENT OFFICE

MILLARD F. CRANK, OF YATESVILLE, KENTUCKY, ASSIGNOR OF ONE-HALF TO ARTHUR BLANKINSHIP, OF YATESVILLE, KENTUCKY

FRUIT PICKER

Application filed August 25, 1926, Serial No. 131,488. Renewed November 1, 1929.

This invention has particular relation to harvesters or fruit pickers, embodying among other characteristics a pair of clamping members carried by a receptacle adapted to pull fruit from twigs and deposit the same within the receptacle.

Another object of the invention embodies means adapted to normally hold the clamping members apart and having communication with an operating means located at a remote point therefrom in order that the fruit located in the most inaccessible positions may be gathered and picked.

With the above and other objects in view, the invention further consists in the following novel features and details of construction, to be hereinafter more fully described, illustrated in the accompanying drawing, and pointed out in the appended claim.

In the drawings:

Figure 1 is an elevation of the invention.

Figure 2 is a view similar to Figure 1, showing the clamping members in closed position.

Figure 3 is a side elevation of the invention in its normally inoperative position.

Figure 4 is an elevation of the invention partly in section and partly broken away to illustrate the construction thereof.

Figure 5 is a sectional view illustrating the mounting of the operating means.

Referring to the drawings in detail, wherein like characters of reference denote corresponding parts, the reference character 10 indicates a standard having a receptacle 11 carried upon one end thereof. A removable receptacle 12 is carried therein, in the manner as illustrated in Figure 4 of the drawings. Companion clamping members 13 are pivotally mounted adjacent the open end of the receptacle 11.

Pivotally mounted upon a common pivot pin 14 which extends transversely of a horizontally disposed cutout portion 15 in the standard 10 are eccentrically mounted links 16 extending in opposite directions from the standard. Rods 17 are connected with the outer extremities of said links and terminate at their opposite ends in hooked portions 18 which are passed through openings provided in the lower edges of the clamping members 13. The shorter ends of the links are connected with retractile springs 19 carried upon the lower portion of the receptacle 11 to normally hold the clamping members spaced apart.

A ring member 20 encircles the standard 10 and is provided with a plurality of looped portions 21, two of which are adapted to receive the hooked ends of the links 22 connected to the shorter ends of the links 16. Another of the looped portions 21 receives the upper hooked end of an operating rod 23 connected with an offset operating lever 24 which has outwardly and oppositely extending arms 25 upon the opposed sides thereof which are bent upon themselves to conform to the configuration of the standard and which are pivotally connected therewith.

It will be noted from the foregoing description and accompanying drawings that the clamping members 13 will be normally spaced apart in order that the fruit may be disposed between said clamping members before the operating lever 24 functions to relieve the operator from depressing said operating lever to hold the clamping members apart.

A slight depression of the operating lever 24 will in turn move the ring 20 downwardly upon the standard 10, the links 22 will rock the links 16 upon their common pivot 14 to elevate the longer ends thereof whereby the rods 17 will be moved upwardly to close the clamping members 13. Upon releasing the operating lever the retractile springs 19 will automatically open the clamping members.

In the operation of the invention, the standard 10 is grasped and raised to postion the clamping members in juxtaposition to its work. The clamping members are normally disposed in the positions as best illustrated in Figures 1 and 4 of the drawings by tension afforded by the springs 19. The clamping members are then raised with the standard to envelop the fruit. The operating lever is then depressed and, due to its connection with the link 21 through the instrumentality of the operating rod 23, will cause the ring 21 to slide and move downwardly upon the standard 10. The ring, is in turn, connected with the adjacent ends of the eccentrically mounted links 16 through the instrumentality of the links 22 which cause the links 16 to rock upon their pivot 14 to raise the outermost ends thereof. Rods 17, establishing connection between the outer ends of the links 16 and clamping members 13, shift the latter to occupy the position as best illustrated in Figure 2 of the drawings. The closing action of the clamping members may be actuated with such force, that twigs holding the fruit may be cut or the fruit pulled from the twigs, as the case may be.

The invention is susceptible of various changes in its form, proportions and minor details of construction, and the right is herein reserved to make such changes as properly fall within the scope of the appended claim.

Having thus described my invention, what is claimed is:

A fruit picker comprising a standard having a receptacle upon one end thereof, clamping members pivotally mounted upon the open end of the receptacle to close the same, cross links eccentrically mounted upon the standard, rods connecting the longer ends of the cross links with the lower edges of the clamping members, retractile springs carried by the receptacle and connected to the shorter ends of the cross links to normally hold the clamping members apart, a ring slidably mounted upon the standard being provided with a plurality of loop portions, other links connected to the shorter ends of the cross links and the loop portions of the ring, an operating lever having pivotal connection with the standard, and an operating rod connected to the operating lever and ring whereby depression of the operating lever will cause the clamping members to close the open end of the receptacle.

In testimony whereof I affix my signature.

MILLARD F. CRANK.